(12) United States Patent
Anderson

(10) Patent No.: US 6,210,252 B1
(45) Date of Patent: Apr. 3, 2001

(54) GAME CALL STRIKER

(76) Inventor: Eric L. Anderson, 573 Park Ave., SW., Bolivar, OH (US) 44612

( * ) Notice: Subject to any disclaimer, the term of this patent is extended or adjusted under 35 U.S.C. 154(b) by 0 days.

(21) Appl. No.: 09/427,369

(22) Filed: Oct. 26, 1999

(51) Int. Cl.[7] ................................................... A63H 5/00
(52) U.S. Cl. ......................................... 446/418; 446/397
(58) Field of Search ................................. 446/418, 397, 446/404; 84/422.4; 81/438

(56) References Cited

U.S. PATENT DOCUMENTS

| 4,640,177 | * | 2/1987 | Elliott, Jr. .......................... 84/422.4 |
| 5,178,575 | * | 1/1993 | Koch .................................. 446/397 |
| 5,765,454 | * | 7/1998 | Barbulescu et al. ................. 81/438 |
| 5,961,367 | * | 10/1999 | Morris ................................ 446/397 |

\* cited by examiner

Primary Examiner—Jacob K. Ackun, Jr.
Assistant Examiner—Urszula M. Cegielnik
(74) Attorney, Agent, or Firm—Sand & Sebolt

(57) ABSTRACT

A game call striker for use in association with a game call includes a body and a plurality of tips that are selectively and interchangeably attachable to the body. In a first embodiment of the present invention, each tip includes a holder that carries a striker element. The striker element can be any of a wide variety of materials that are known and understood in the relevant art for frictionally interacting with the game call to produce a game sound. A second embodiment of the invention is presented wherein at least a portion of the game call striker is coated with an anti-reflective coating to reduce the likelihood of alerting game with movement and/or the reflection of light from the game call striker. A third embodiment of the invention is presented wherein the tips do not include a holder but are manufactured entirely of the striker element. The tips of the third embodiment may include an attachment socket for facilitating attachment onto the body depending upon the specific material characteristics of the particular striker element.

10 Claims, 4 Drawing Sheets

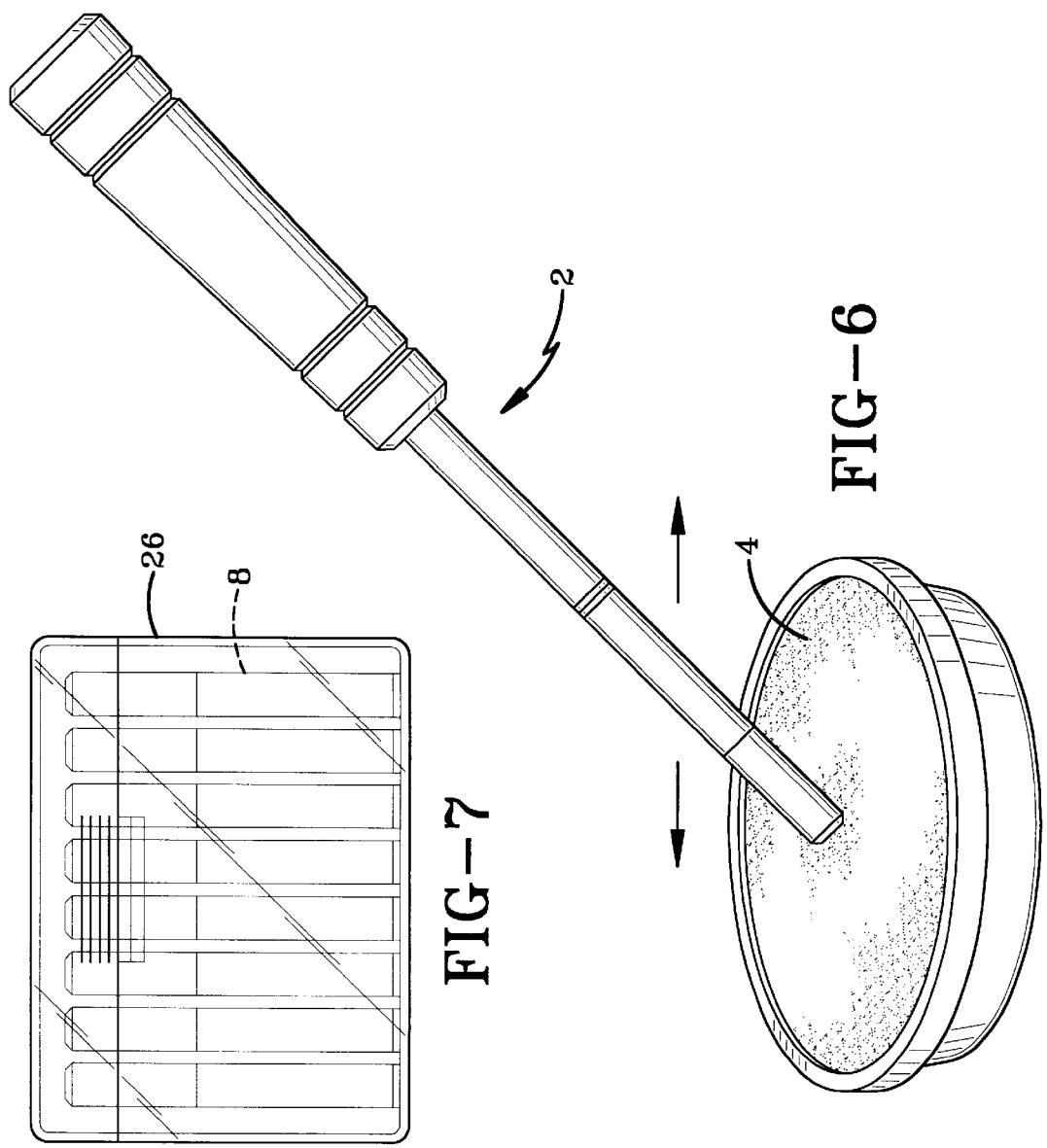
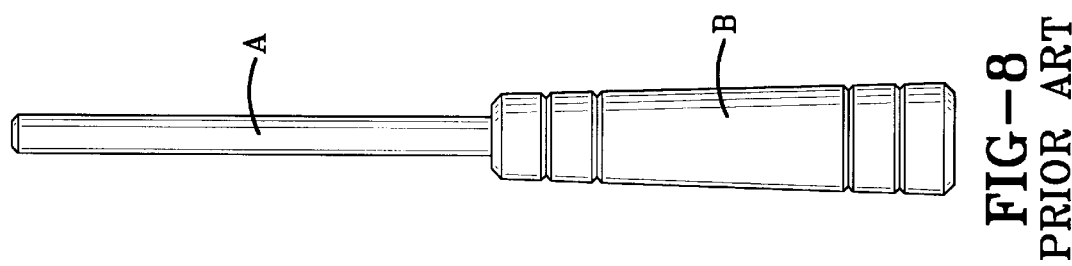

GAME CALL STRIKER

BACKGROUND OF THE INVENTION

1. Technical Field

The present invention relates generally to game calls and, more particularly, to a friction game call employing a game call striker. Specifically, the invention relates to a game call striker for frictionally interacting with a game call, the game call striker having a removable and replaceable tip.

2. Background Information

Numerous devices are known and understood in the relevant art for use by hunters and others for producing game sounds. Such game sounds are intended to be heard by wild game for the purpose of attracting the wild game to the source of the game sound. Such devices are collectively known as game calls and are of numerous configurations such as horns for attracting ducks, rosin-based frictional chirping devices for attracting various species of birds, frictional call and striker combinations that produce a wide variety of sounds, as well as other devices. The present invention is most particularly directed to a frictional call and striker apparatus.

As is known and understood in the relevant art, a game call is a handheld device that typically includes a sounding plate having a frictional upper surface and a cup in which the friction plate is disposed. The friction plate typically is manufactured of a material such as slate, ceramic, or other materials. The cup is typically manufactured of a plastic or other material and often includes one or more sound chambers to amplify the sound produced by the friction plate when frictionally excited by a game call striker.

As is understood in the relevant art, a game call striker includes a striker element that is attached to a block. A game call striker of the type known and understood in the prior art is depicted generally in FIG. 8 of the accompanying drawings. The striker element A is a solid, cylindrical member that extends outwardly from block B. The striker element is typically manufactured from one of a variety of materials such as various woods, metals, and other materials. The block is typically manufactured of any of a variety of materials such as wood and plastic, as well as other materials.

The device is used by holding the game call in one hand with the upper surface of the friction plate facing upwardly and with the game call striker held in the other hand. The game call striker is typically held by the striker element close to the exposed tip of the striker element, much like one would hold a writing instrument between the thumb and the first two fingers. The tip of the striker element is then frictionally rubbed across the upper surface of the friction plate in various fashions and in various directions to produce different types of animal calls.

Much of the appeal of the call and striker type of game call comes from the wide variety of sounds the device can produce. For instance, a given game call striker can produce numerous types of sounds by varying the speed, direction, angle, and force with which the tip is frictionally slid across the upper surface of the game call. Additionally, different game call strikers having striker elements manufactured of different materials likewise produce different types of sounds. For instance, a game call striker having a striker element manufactured of hickory wood will produce a group of sounds that are different than the sounds produced by a maple wood striker element which are, in turn, different than the sounds produced by an aluminum striker element. Inasmuch as the hunter or other person who uses the game call and striker assembly is seeking to attract game, the hunter or other person must be prepared to produce as many various types of game sounds as is necessary to attract the desired game.

It is thus desired that a hunter or other person typically carry several different game call strikers at any one time for producing a wide variety of animal sounds as needed. Additionally, game calls are most typically employed outdoors where the game call and striker components can become wet. Moisture from various sources can affect the sound produced between a game call striker and a game call and often can impair the friction therebetween to the extent that no sound is produced. As such, it is desired that a person employing a game call and striker apparatus carry a plurality of replacement strikers for use if one or more of the strikers that are being used become damp or wet.

While such devices are generally effective for their intended use, such devices have not, however, been without limitation. For instance, the large number of different and replacement game call strikers that must be carried at any one time often become cumbersome, both in terms of the weight as well as the volume of materials that must be carried by the user. Additionally, the user must typically visually inspect several different game call strikers until locating a specific game call striker having the desired striker element, which is additionally cumbersome. As such, a need exists for an improved device that produces numerous types of game sounds without requiring the user to carry the heavy and voluminous number of game call strikers as is presently done when employing prior art devices. Such an improved device preferably would include a game call striker having a plurality of interchangeable tips.

SUMMARY OF THE INVENTION

In view of the foregoing, an objective of the present invention is to provide a game call striker having a plurality of interchangeable tips.

Another objective of the present invention is to provide a game call striker having a replaceable striker element.

Another objective of the present invention is to provide a game call striker that can produce a wide variety of game sounds.

Another objective of the present invention is to provide a game call striker that can be used with game calls of the type known and understood in the relevant art.

Another objective of the present invention is to provide a game call striker that is lightweight.

Another objective of the present invention is to provide a game call striker that can receive an anti-reflective coating.

Another objective of the present invention is to provide a game call striker that occupies a relatively small amount of space.

These and other objectives are achieved from the game call striker of the present invention that is adapted to frictionally interact with an upper surface of a game call, the general nature of which can be stated as including a body and at least a first tip, the at least first tip selectively attachable to the body.

Other objectives and advantages are obtained by the combination of the present invention, the general nature of which can be stated as including a game call and a game call striker having a body and at least a first tip, the at least first tip being selectively attachable to the body.

Still other objectives and advantages are obtained from the improvement to a game call striker of the type including a tip and a body, the tip being adapted to frictionally interact with an upper surface of a game call, the general nature of the improvement including the tip being selectively attachable to the body.

Still other objectives and advantages are obtained from the method of producing a game sound with a game call having an upper surface, the general nature of which can be stated as including the steps of providing a turkey call striker including a body and a plurality of tips selectively and interchangeably attachable to the body, selecting a tip, attaching the tip to the body, and frictionally moving the tip over the upper surface of the game call to cause the game call to produce a game sound.

BRIEF DESCRIPTION OF THE DRAWINGS

The preferred embodiments of the invention, illustrative of the best modes in which applicant has contemplated applying the principles of the invention, are set forth in the following description and are shown in the drawings and are particularly and distinctly pointed out and set forth in the appended claims.

FIG. 6 is a perspective view of the first embodiment being used in conjunction with a game call;

FIG. 7 is a view of a box that is used to hold one or more tips; and

FIG. 8 is a front elevational view of a prior art game call striker.

Similar numerals refer to similar parts throughout the specification.

DESCRIPTION OF THE PREFERRED EMBODIMENTS

The game call striker of the present invention is indicated generally at the numeral 2 in FIGS. 1, 2, 4—4F, and 6–7. Game call striker 2 is a device that is used in conjunction with a game call 4 of the type known and understood in the relevant art to produce a game sound. Game call 4 can be any of a wide variety of devices of the type known and understood in the relevant art, and may be a device known as a SLA-TEK™ call manufactured by Knight & Hale Game Calls of Cadiz, Ky. 42211, USA, but may be virtually any game call without departing from the spirit of the present invention. Game call striker 2 frictionally interacts with game call 4 to produce a wide variety of game sounds.

Figures 1, 2, 3:
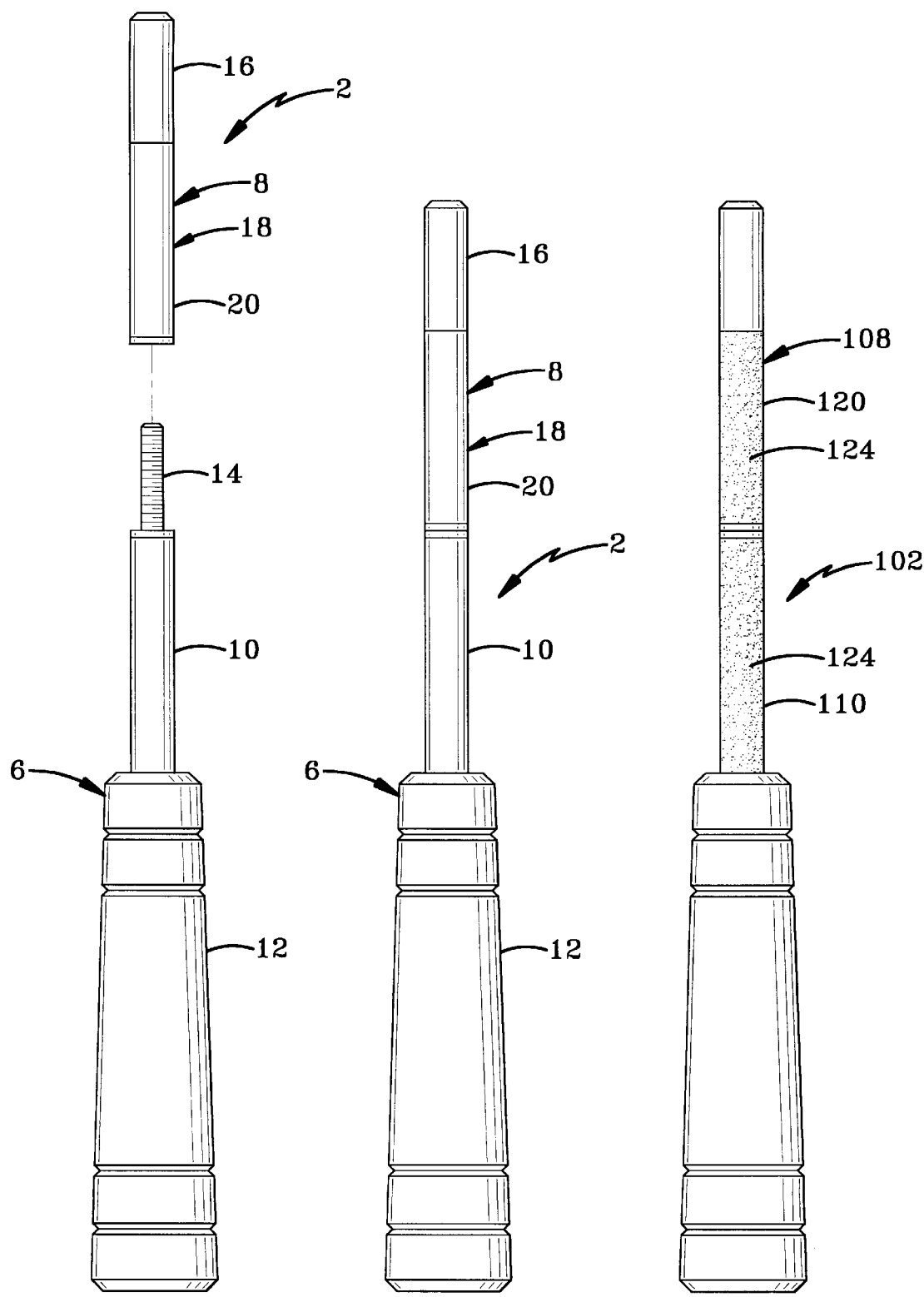
FIG. 1 is an exploded front elevational view of a first embodiment of the game call striker of the present invention.
FIG. 2 is a front elevational view of the first embodiment.
FIG. 3 is a front elevational view of a second embodiment of the game call striker of the present invention.

As is best shown in FIG. 1, game call striker 2 includes a body 6 and a tip 8. In accordance with the objectives of the present invention, tip 8 is selectively attachable to body 6. Further in accordance with the objectives of the present invention, a plurality of tips 8 are available for selective attachment onto body 6.

Body 6 includes a shaft 10, a block 12, and an attachment shank 14. Shaft 10 is an elongated cylindrical member formed out of a stiff, resilient material such as aluminum, although other materials such as plastic, wood, and steel, among other materials, may be used without departing from the spirit of the present invention.

Block 12 is a solid frusto-conic or cylindrical member made out of a stiff, lightweight material such as wood, although other materials such as plastic and aluminum, among other materials, may be used without departing from the spirit of the present invention. Shaft 10 is axially aligned with block 12 and protrudes outwardly therefrom. While in the present invention shaft 10 is fixedly attached to block 12, it is understood that shaft 10 can be detachable from block 12 without departing from the spirit of the present invention.

Attachment shank 14 is disposed on shaft 10 at the end of shaft 10 opposite its attachment with block 12. Attachment shank 14 is an elongated cylindrical member formed with a plurality of external helical threads. Attachment shank 14 is axially aligned with shaft 10 and block 12.

Tip 8 includes a striker element 16 that is carried by a holder 18. Striker element 16 may be any of a wide variety of materials that can frictionally interact with game call 4 such as glass, stone, aluminum, ceramic, carbon, plastic, and wood, as well as a wide variety of other materials. For instance, stone can include materials such as slate, limestone, as well as a variety of other stone materials. Plastic can include materials such as polycarbonate, polysulfone, and polyvinyl chloride (PVC), as well as other plastic materials. Additionally, wood can include materials such as hickory, rosewood, mahogany, oak, maple, cedar, walnut, and purple heart, as well as other wood materials. As such, striker element 16 can be any of a wide variety of materials that are able to frictionally interact with game call 4 to produce a game sound therewith.

Figure 4C:
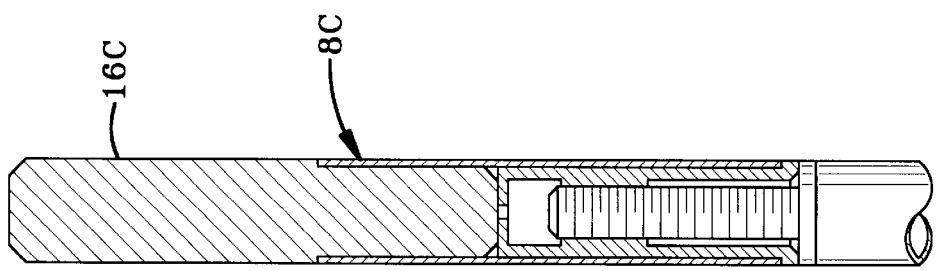
FIG. 4C is a view similar to FIG. 4, except showing a fourth material used as the striker element.
Figure 4B:
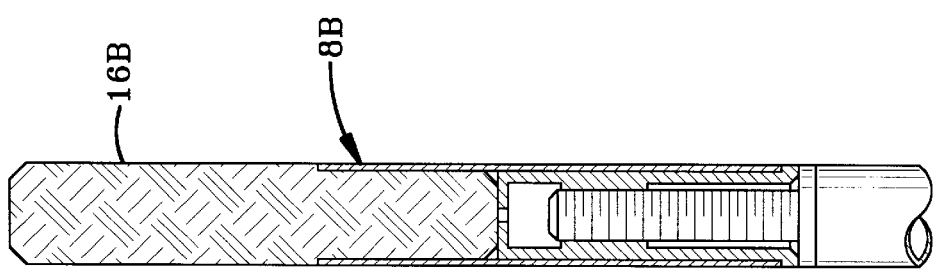
FIG. 4B is a view similar to FIG. 4, except showing a third material used as the striker element.
Figure 4A:
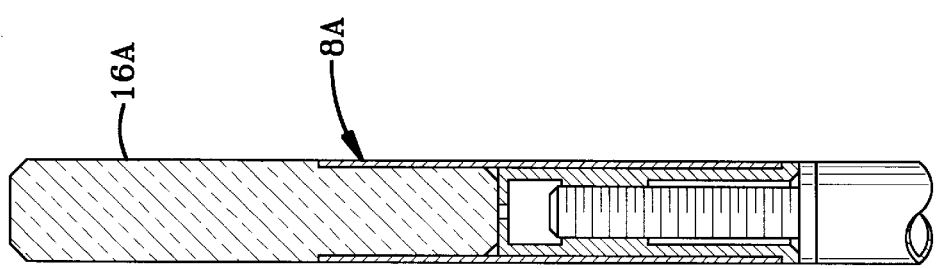
FIG. 4A is a view similar to FIG. 4, except showing a second material used as the striker element.
Figure 4:
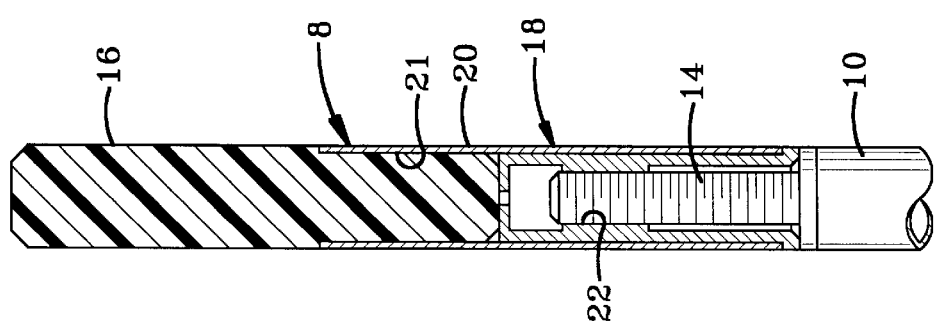
FIG. 4 is an enlarged sectional view of the tip of the first embodiment showing a first material used as the striker element.

As is best shown in FIG. 4, holder 18 includes an elongated cylindrical barrel 20 formed with a cylindrical hole 21 extending longitudinally therethrough and an attachment socket 22. Attachment socket 22 is disposed in one end of hole 21 and is formed with a plurality of internal threads that cooperate threadably with the threads formed on attachment shank 14. Striker element 16 is received in the end of hole 21 opposite attachment socket 22 and is fixedly retained therein. Striker element 16 and barrel 20 are both preferably of a cylindrical configuration having an outer diameter similar to that of shaft 10, although tip 8 and shaft 10 can have other configurations depending upon the needs of the particular application without departing from the spirit of the present invention.

As can be seen in FIG. 4, attachment socket 22 is disposed inside barrel 20, and striker element 16 extends inside hole 21 and protrudes outwardly therefrom. The outermost tip of striker element 16 and the opening of attachment socket 22 into which attachment shank 14 is received are thus disposed at opposite ends of tip 8.

As indicated hereinbefore, tip 8 is selectively attached onto body 6. More specifically, attachment shank 14 is threadably received in attachment socket 22 to threadably attach tip 8 onto body 6. It is understood, however, that virtually any type of detachable mounting system can be used to selectively attach tip 8 onto body 6 without departing from the spirit of the present invention. Any such alternative attachment system preferably will be simple to use, can be operated without the assistance of tools, and allows tip 8 and body 6 to be repeatedly attached to one another and detached therefrom. In the first embodiment, shaft 10, attachment shank 14, and holder 18 are all preferably manufactured out of the same material, such as aluminum, although different materials may be used for each of these components without departing from the spirit of the present invention.

Figure 4F:
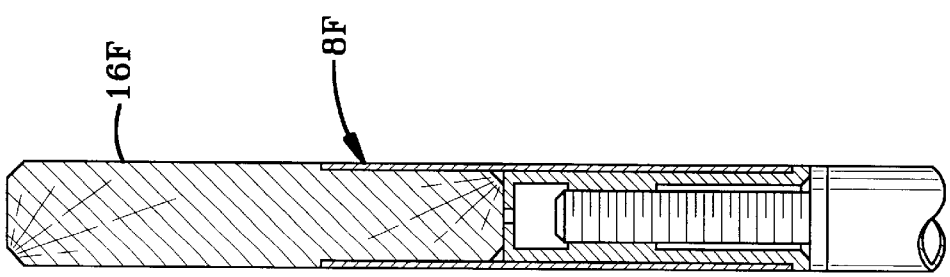
FIG. 4F is a view similar to FIG. 4, except showing a seventh material used as the striker element.
Figure 4E:
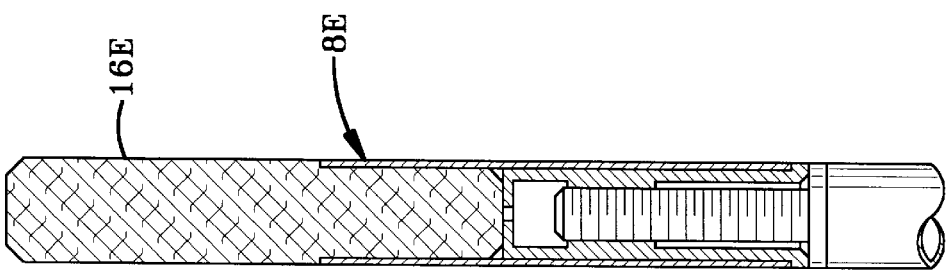
FIG. 4E is a view similar to FIG. 4, except showing a sixth material used as the striker element.
Figure 4D:
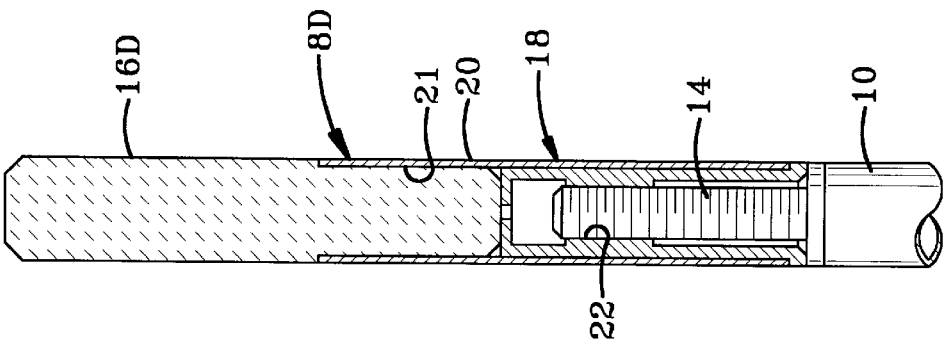
FIG. 4D is a view similar to FIG. 4, except showing a fifth material used as the striker element.

In accordance with the objectives of the present invention, a plurality of tips 8 are provided wherein each tip 8 includes a striker element 16 manufactured out of a different material. For instance, as shown in FIG. 4, striker element 16 used in conjunction with tip 8 is manufactured out of plastic. As is shown in FIG. 4A, tip 8A includes striker element 16A manufactured out of glass. As is shown in FIG. 4B, tip 8B includes striker element 16B manufactured out of stone. As is shown in FIG. 4C, tip 8C depicted therein includes striker element 16C manufactured out of aluminum. As is depicted in FIG. 4D, tip 8D includes striker element 16D manufactured out of ceramic. As is shown in FIG. 4E, tip 8E includes striker element 16E manufactured out of carbon. Likewise, as is shown in FIG. 4F, tip 8F includes striker element 16F manufactured out of wood.

In accordance with the objectives of the present invention, any of tips 8–8F can be used interchangeably with body 6. More specifically, attachment shank 14 can selectively receive any one of tips 8–8F at any one time. It can be seen, therefore, that a user can be using game call striker 2 in association with game call 4 with tip 8F installed on shaft 10. If desired, the user can detach tip 8F from attachment shank 14 and replace it with tip 8D if desired, or can replace it with a different tip 8F, or any of tips 8–8F, according to the specific needs of the application.

The user thus will typically wish to carry only one body 6, yet carry a plurality of tips 8. A box 26 is thus provided to carry a plurality of tips 8 therein. Box 26 preferably is manufactured out of a lightweight translucent material such as polyethylene, although other materials may be used without departing from the spirit of the present invention. By placing tips 8 inside box 26, striker elements 16 of tips 8 can be readily observed by the user such that the user can quickly select one of tips 8 for installation onto body 6. Such convenience is particularly useful if the user is attempting to rapidly change tip 8 on body 6 to attract a specific animal that is likely to depart from the immediate area if an appropriate game sound is not made quickly.

Once tip 8 is installed onto body 6, striker element 16 of game call striker 2 is frictionally rubbed in contact with the upper surface of game call 4 to frictionally produce a game sound. If it is desired to replace tip 8 with another tip 8 for purposes of creating a different game sound or for the purpose of replacing tip 8 because it has become or wet, tip 8 is detached from body 6, a different tip 8 is observed and selected from box 26, and the replacement tip 8 is then installed onto body 6. With the replacement tip 8 installed onto body 6, game call striker 2 is then ready to produce game sounds when frictionally used in conjunction with game call 4.

Inasmuch as a plurality of tips 8 can be carried in box 26, the user need carry only a single body 6 along with box 26 to be able to produce a wide variety of game sounds when used in association with game call 4. In this regard, the user no longer is required to carry multiple full-sized prior art game call strikers of the type depicted in FIG. 8. Additionally, inasmuch as box 26 is at least nominally translucent, a replacement tip 8 can be readily selected by the user and can be installed onto body 6 to quickly reconfigure game call striker 2 without the need to examine numerous prior art game call strikers of the type depicted in FIG. 8. As such, game call striker 2 provides substantial benefits in convenience, ease of use, and speed that were not heretofore understood in the relevant art.

A second embodiment of the present invention is indicated generally at the numeral 102 in FIG. 3. Game call striker 102 is similar to game call striker 2, except that shaft 110 and barrel 120 each include an anti-reflective coating 124 on the outer surface thereof. As is understood in the relevant art, numerous types of game, particularly birds, possess a highly acute sense of sight and can be alerted and frightened away by motion and/or the reflection of light. As such, anti-reflective coating 124 is provided on shaft 110 and barrel 120 to preferably alleviate the likelihood of frightening away desirable animals. In this regard, if shaft 110 and barrel 120 are manufactured out of a metal such as aluminum, anti-reflective coating 124 provides substantial benefits by drastically reducing the amount of light that is reflected from shaft 110 and barrel 120.

Anti-reflective coating 124 can be any of a variety of materials known and understood in the relevant art such as paint, although other coatings of the type known and understood in the relevant art may be employed without departing from the spirit of the present invention. Likewise, anti-reflective coating 124 can be in the form of a surface treatment such as bead blasting or etching that would convert an otherwise shiny and reflective surface into a relatively dull, non-reflective surface. It is thus understood that anti-reflective coating 124 can be of virtually any configuration depending upon the needs of the particular application that reduces the likelihood that desirable game will be able to observe game call striker 2. It is understood, however, that tip 108 can be interchangeably installed onto shaft 10 of game call striker 2, and that any of tips 8 from game call striker 2 can interchangeably be installed onto shaft 110 of game call striker 102.

Figure 5:
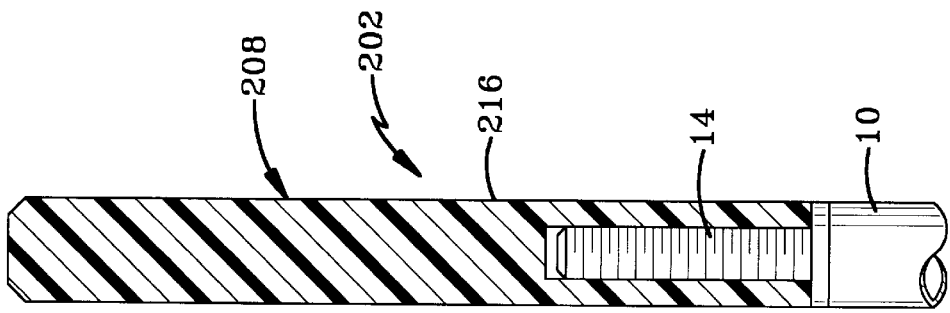
FIG. 5 is a sectional view of a third embodiment of the game call striker of the present invention.

A third embodiment of the present invention is indicated generally at the numeral 202 in FIG. 5. Game call striker 202 is similar to game call striker 2, except that tip 208 does not include holder 18, but rather is manufactured solely out of striker element 216. Striker element 216 can be manufactured out of any of the materials set forth above for use in association with striker element 16. Tip 208 typically would be less expensive to manufacture than tip 8 inasmuch as only a single material need be used. Additionally, tip 208 would provide an additional amount of striker element 216 beyond that provided by striker element 16 of game call striker 2. The additional amount of striker element 216 provided is beneficial inasmuch as striker element 216 and striker element 16 ultimately wear away during frictional interaction with game call 4. Tip 208 attaches onto attachment shank 14 exactly as any of tips 8 attach thereto, and may be used interchangeably therewith. It is additionally understood that tip 208 may additionally include a threaded insert to facilitate attachment thereof onto attachment shank 14 depending upon the specific material properties of striker element 216.

Accordingly, the improved Game Call Striker apparatus is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the Game Call Striker is constructed and used, the characteristics of the construction, and the advantageous new and useful results obtained; the new and useful structures, devices, elements, arrangements, parts, and combinations are set forth in the appended claims.

What is claimed is:

1. A game call striker adapted to frictionally interact with an upper surface of a game call, the game call striker comprising:
   a body;
   at least a first tip adapted to engage the surface of a came call to create a game sound, the at least first tip selectively attachable to the body;
   at least one of the at least first tip and the body is at least partially coated with an antireflective coating.

2. A game call striker adapted to frictionally interact with an upper surface of a game call, the game call striker comprising:
   a body;
   at least a first tip adapted to engage the surface of a game call to create a game sound, the at least first tip selectively attachable to the body;
   the at least first tip includes a first holder and a first striker element, the first holder selectively attachable to the body, the first holder carrying the first striker element.

3. The game call striker as set forth in claim 2, wherein the first striker element is at least partially manufactured of at least one of the materials in the group consisting of glass, stone, aluminum, ceramic, carbon, plastic, and wood.

4. The game call striker as set forth in claim 3, further comprising a second tip having a second holder carrying a second striker element, the at least first and second tips being alternatively and selectively attachable to the body, the second tip being at least partially manufactured of at least one of the materials in the group consisting of glass, stone, aluminum, ceramic, carbon, plastic, and wood.

5. The game call striker as set forth in claim 2, wherein the at least first tip and the body are each at least partially coated with an anti-reflective coating.

6. The game call striker as set forth in claim 2, wherein the at least first tip is threadably attachable to the body.

7. The game call striker as set forth in claim 2, wherein the body includes a shaft; the shaft has a first diameter and the at least first tip has a second diameter, the first diameter being substantially equal to the second diameter.

8. In combination, a game call and a game call striker, the combination comprising:
   a game call;
   a game call striker having a body, a shaft, and at least a first tip;
   the shaft having a first end connected to the body and a second end;
   the shaft having a first diameter;
   the tip having a longitudinal length with a maximum outer diameter along the longitudinal length;
   the maximum outer diameter of the at least first tip being no greater than the first diameter; and
   the at least first tip being selectively attachable to the body; the game call striker adapted to frictionally engage the game call to create a game sound.

9. The combination set forth in claim 8, further comprising a second tip, the at least first and second tips being alternatively and selectively attachable to the body.

10. The combination set forth in claim 9, wherein the at least first and second tips are each at least partially manufactured of at least one of the materials in the group consisting of glass, stone, aluminum, ceramic, carbon, plastic, and wood.

* * * * *